United States Patent [19]

Bigelow et al.

[11] Patent Number: 5,448,419

[45] Date of Patent: Sep. 5, 1995

[54] APPARATUS AND METHOD FOR ANHYSTERETICALLY RECORDING FROM MASTER DRUM TO SLAVE WEB

[75] Inventors: Donald O. Bigelow, Webster; Thomas W. Palone, Rochester, both of N.Y.

[73] Assignee: Eastman Kodak Company, Rochester, N.Y.

[21] Appl. No.: 75,714

[22] Filed: Jun. 11, 1993

[51] Int. Cl.⁶ ............................................. G11B 5/86
[52] U.S. Cl. .................................................. 360/17
[58] Field of Search ..................... 360/16–17, 360/73.04, 136, 31; 369/84

[56] References Cited

U.S. PATENT DOCUMENTS

| | | | |
|---|---|---|---|
| 2,686,676 | 8/1954 | Rowe et al. | 274/4 |
| 2,709,597 | 5/1955 | Stroobants | 274/40 |
| 2,734,033 | 2/1956 | Menard | 252/62.5 |
| 2,862,845 | 12/1958 | Szegvari | 154/53.6 |
| 2,915,357 | 12/1959 | Barkley | 346/74 |
| 2,984,538 | 5/1961 | Kelner et al. | 346/138 |
| 3,630,424 | 12/1971 | Rau | 226/95 |
| 3,682,690 | 8/1972 | Amos et al. | 117/122 P |
| 3,747,080 | 7/1973 | Taylor | 340/174.1 E |
| 3,777,075 | 12/1973 | Hendershott, III et al. | 179/100.2 B |
| 3,782,947 | 1/1974 | Krall | 430/21 |
| 3,952,133 | 4/1976 | Amos et al. | 428/354 |
| 4,110,797 | 8/1978 | Hoshino et al. | 360/17 |
| 4,123,784 | 10/1978 | Ichiugi | 360/100 |
| 4,212,436 | 7/1980 | Schoettle et al. | 242/192 |
| 4,277,806 | 7/1981 | Jeffers et al. | 360/17 X |
| 4,320,523 | 3/1982 | Horikawa et al. | 375/103 |
| 4,341,363 | 7/1982 | Inatome | 360/73.04 X |
| 4,504,542 | 3/1985 | Miyoshi et al. | 428/336 |
| 4,626,931 | 12/1986 | Hori et al. | 360/16 |
| 4,633,357 | 12/1986 | Kinjo | 360/136 |
| 4,637,963 | 1/1987 | Nishimatsu et al. | 428/694 |
| 4,698,700 | 5/1987 | Shirai | 360/16 |
| 4,698,701 | 10/1987 | Gantzhom Jr. et al. | 360/16 |
| 4,882,636 | 11/1989 | Billings et al. | 360/16 |
| 5,179,475 | 1/1993 | McClure | 360/17 |
| 5,234,762 | 8/1993 | Palone | 360/136 X |

FOREIGN PATENT DOCUMENTS

| | | | |
|---|---|---|---|
| 472364 | 2/1992 | European Pat. Off. | G11B 31/00 |
| 91/11750 | 8/1991 | WIPO | G03C 5/14 |

OTHER PUBLICATIONS

*Patent Abstracts of Japan*, vol. 7, No. 101 (P-194) (1246) 28 Apr. 1983 & JP-A-58 023 330 (SONY) 12 Feb. 1983 (Abstract).

*Primary Examiner*—Andrew L. Sniezek
*Attorney, Agent, or Firm*—Charles E. Snee, III

[57] ABSTRACT

A ported vacuum drum (20, 56–98) is provided on its exterior cylindrical surface (22) with one or more lengths (24) of a master magnetic recording medium supported by bands (102) of elastomeric material in position to contact a layer (14) of slave magnetic recording medium provided on one side and along at least one edge of a web (10); so that, vacuum applied (74–82) between the cylindrical surface and the web at locations (88–94) spaced from the zone of contact (98) between the recording media will hold the slave layer on the web securely in contact with the length of master magnetic recording medium on the drum as the drum rotates, thereby permitting anhysteretic recording from the master to the slave. A method of anhysteretically recording is taught.

11 Claims, 5 Drawing Sheets

APPARATUS AND METHOD FOR ANHYSTERETICALLY RECORDING FROM MASTER DRUM TO SLAVE WEB

TECHNICAL FIELD

The invention concerns transferring recorded information from one magnetic medium to another. More particularly, the invention concerns apparatus and methods for anhysteretically recording from a high coercivity master medium carried on a rotatable, circular cylindrical drum to a lower coercivity slave medium carried on a web of indeterminate length wrapped on the drum; so that, information previously recorded on the master medium is recorded repeatedly along the length of the slave medium as the cylindrical drum rotates and the web translates in contact with a portion of the cylindrical drum.

BACKGROUND ART

Conventional magnetic recording requires a stationary recording head which makes contact with a moving surface of a magnetic medium, which may be in web, disk or drum form. Because of the tendency of such heads to abrade the magnetic medium, at least the surface layer of the magnetic medium generally is made from a durable material selected to resist abrasion. In recent years, photographic films have been developed which include on one side of a base material, various layers of photosensitive materials; and on the other side, a thin, virtually transparent layer of magnetic medium. The magnetic medium can be used, for example, during manufacture of the film to record information related to the film's characteristics; during use of the film in the camera to enable the camera to read and adjust itself in response to previously recorded information and/or to record information about camera settings and scene characteristics; and during processing or developing of the film to enable the processing equipment to read previously recorded information and adjust the processing parameters accordingly. However, because of the presence of the magnetic medium in a photographic film, the properties of the surface layer of the magnetic medium are chosen more for their photographic suitabilities than for their resistance to the sort of abrasion which can occur due to contact with a stationary recording head in a conventional recording process. Any abrasion on the film surface must be avoided since it would degrade the optical properties of the film and thereby prevent capture and reproduction of high quality images. As a result, if conventional recording apparatus were used to record to the magnetic recording medium on such a film, there would be a danger that the magnetic medium would be damaged due to abrasion. Use of a contact head is acceptable in a camera due to the low speed of recording and reading but would not be acceptable in a high speed film manufacturing process. Moreover, even if a small amount of abrasion were acceptable, the abraded material would tend to build up on the recording head, thereby increasing the gap between the head and the recording medium and potentially degrading the signal applied to the recording medium to an unacceptable level. Also, such abraded material would tend to break loose from the head, resulting in loose dirt on the film which would degrade performance.

Another type of recording process, known as anhysteretic recording, has been used for many years for duplication of magnetic media, particularly video and audio tapes, without requiring the use of a recording head which may abrade the duplicate or slave medium. In this process, a master magnetic medium is prepared which typically has a magnetic coercivity about two to three times higher than the coercivity of the slave medium on which duplicate copies are to be made. The master medium may be provided in web or drum format and is prerecorded, using a conventional contact recording head, with the information to be duplicated. The master medium and the slave medium are then brought into intimate, stable contact, with no relative motion, in the presence of a decaying, alternating magnetic bias field; so that, a mirror image of the information on the master is transferred to the slave.

Since there is no abrasion between the master and slave media in conventional apparatus and processes useful for anhysteretic recording, the application of such apparatus and processes to record to photographic film having a magnetic medium would appear promising. However, recording to a photographic film introduces a number of problems not found in conventional duplicating of video and audio tapes. For example, applications for still camera photography will require recording of digital signals of relatively low bit density due to the characteristics of the magnetic medium on the film, likely no higher than 1000 bits per inch (39.4 bits per millimeter) which means that recording onto the film must be done with a very high degree of reliability since redundant recording will not be feasible. Much higher bit densities typically are used for data, video and audio applications, such as 10,000 bits per inch (394 bits per millimeter) for digital tape, 6,000 bits per inch (236 bits per millimeter) for floppy disks and 10,000 bits per inch (394 bits per millimeter) for Winchester disks. So that conventional, contact head equipment for reading the signals recorded to the photographic film will not damage the central image area of the film, it is desired to record only along the very edges of the film, rather than in the central portion of the magnetic medium as would be the case for non-photographic applications. Because the well known anticlastic effect will cause the edges of the slave medium to curl away slightly from an underlying master medium in drum format, intimate contact may be reduced in the very area where recording is desired. This effect is more pronounced with a photographic film than with a conventional magnetic tape for given levels of tension and elastic modulus, since the film is several times thicker than such tape. Moreover, air tends to become entrained during recording between the slave and master media which causes loss of intimate contact and prevents good signal transfer from the master medium to the slave medium, particularly at higher web velocities and with wider webs.

Pinch rollers have been used to squeeze air from between the media; but with a pressure sensitive photographic film, such rollers are undesirable since they may cause images on the exposed film to exhibit unsightly pressure marks. Various types of air clamping devices are also known which apply elevated pressure air to the media to force air from the interface and bring the media into the desired intimate contact. However, such devices tend to be very noisy, can actually cause instabilities by forcing air into the interface and are expensive to operate due to their continuous need for compressed air. Where the master medium and the slave medium are both in web format, recording onto a slave photographic film with the magnetic medium on the back of the film in some arrangements would require that the emulsion side of the film be in contact with a backing roll for the master and slave media, which may cause damage to the emulsion.

Thus, a need has existed for improvements to conventional apparatus and methods for anhysteretic recording to suit them for recording to photographic films bearing magnetic media. More particularly, a need has existed for anhysteretic recording apparatus and methods which can record along the edges of a photographic film with low signal density and low loss of signal and which can efficiently remove air from the interface between the media being recorded at high speeds, without risking pressure marking of or other damage to the film. A need has existed for such an apparatus which is readily manufactured with conventional technology; is compact; and can use renewable, conventional recording tape for the magnetic master, which may be prerecorded.

SUMMARY OF THE INVENTION

The apparatus of the invention is useful for anhysteretically recording information onto a first web bearing a first, magnetic recording medium, the first web having a first pair of opposed edges separated by a first width of the first web. In a preferred embodiment, the apparatus comprises a circular cylindrical drum having a first exterior cylindrical surface with a second pair of opposed edges separated by a second width at least as long as the first width. At least one annular band of elastomeric material is supported by and extended around the drum, the band of elastomeric material having a second exterior cylindrical surface concentric with the first exterior cylindrical surface. At least one length is provided of a second web having a third exterior surface, the second web comprising a second, magnetic recording medium, the second web further having an interior surface adhered to the second exterior cylindrical surface, the elastomeric material at the second exterior cylindrical surface and the second web at the interior surface being mutually adherent directly to one another. The second web is supported by and extended as a band of the second, magnetic recording medium around the second exterior cylindrical surface. The band of the second, magnetic recording medium is in position to contact the first, magnetic recording medium, when the first web is wrapped onto the drum, to anhysteretically transfer information in an annular zone defined by an interface between the second web and the first web. Means associated with the drum are provided for applying subatmospheric pressure at the first exterior cylindrical surface at locations spaced from the annular zone, to cause the first web to establish intimate contact with the second web in the annular zone.

The interface between the second web and the first web may occur along either or both of the pair of edges of the first web. The elastomeric material may have a Shore A hardness in the range of 10 to 40 durometer. The elastomeric material may be a polyester polyurethane; the interior surface of the second web may comprise a surface layer of polyester contacting the polyurethane; and the second web may have a thickness in the range of 0.00025 to 0.0035 inch (0.00064 to 0.0089 cm). The length of the second web comprises first and second ends, the ends being butted to one another on the second exterior cylindrical surface. In one embodiment of the invention, there are two of the bands of the second, magnetic recording medium to contact the first, magnetic recording medium in a pair of the annular zones, one along each of the first, opposed edges of the first web. The opposed edges of the first web may be positioned essentially midway of the corresponding edges of the bands of the second, magnetic recording medium.

Except for the presence of the annular band of elastomeric material and the second, magnetic recording medium, the cylindrical drum may be of the general type shown in commonly assigned U.S. Pat. No. 3,630,424, incorporated into this specification by reference, which is provided in the familiar manner with a stationary interior porting unit to limit the application of vacuum to a portion of the circumference of the drum. The first, magnetic recording medium may be of the type shown in commonly assigned U.S. Pat. Nos. 3,782,947 and 4,320,523 and in commonly assigned published International Application No. WO 91/11750. The second, magnetic recording medium may be of the type discussed later in this specification, which also is disclosed in commonly assigned U.S. patent application Ser. No. 07/811,386 filed 20 Dec. 1991.

The means for applying subatmospheric pressure may comprise a plurality of circumferential grooves in the first exterior cylindrical surface; a plurality of axial grooves in the first exterior cylindrical surface, the axial grooves intersecting the circumferential grooves; a plurality of radial bores extending from the grooves into the drum; and means for applying subatmospheric pressure to the radial bores over an arc of a circumference of the drum, whereby subatmospheric pressure is applied between the first web and the drum. The first, magnetic recording medium may have a coercivity in the range of 500 to 1500 Oe; and the second, magnetic recording medium may have a coercivity in the range of about 1800 to 2200 Oe.

The apparatus of the invention may further comprise means for driving the drum at a preferably constant velocity to meter the first web through the apparatus; though some variation in velocity is tolerable. A first means, upstream of the drum, applies tension to the first web approaching the drum; and a second means, downstream of the drum, applies tension to the first web leaving the drum. Alternatively, the apparatus may further comprise means for mounting said drum for rotation in response to movement of the first web; means for applying tension to the first web approaching the drum; a metering roll downstream of the drum; means for driving the metering roll at an essentially constant velocity to meter the first web through said apparatus; and means for applying tension to the first web leaving the metering roll. In both cases, an essentially constant velocity is preferred to facilitate stabilization of the interface between the two webs.

The method of the invention is useful for anhysteretically recording information on a first web bearing a first, magnetic recording medium, the web having a first pair of opposed edges separated by a first width of the web. A circular cylindrical drum is provided having a first exterior cylindrical surface with a second pair of opposed edges separated by a second width at least as long as the first width. At least one annular band of elastomeric material is supported by and extended around the drum, the band of elastomeric material having a second exterior cylindrical surface concentric with the first exterior cylindrical surface. At least one length of a second web is provided, the length having a third exterior surface, the second web comprising a second, magnetic recording medium and an interior surface adhered to the second exterior cylindrical surface. The length of the second web extends as a band of the second, magnetic recording medium around the second exterior cylindrical surface. The band of the second, magnetic recording medium thus is in position to contact the first, magnetic recording medium, when the first web is wrapped onto the drum, to anhysteretically transfer information in an annular zone defined by an interface between the second web and the first web. The first web is wrapped around an arc of the first exterior cylindrical surface to define the interface between the first, magnetic recording medium and the second, magnetic recording medium. Subatmospheric pressure is applied through the first exterior cylindrical surface at locations spaced from the annular transfer zone, to cause the first web to establish intimate contact with the second web in the annular zone. The drum is rotated; and a magnetic bias field is applied to cause the transfer.

A number of advantageous effects are achieved with the apparatus and method of the invention. The information to be recorded onto the second, magnetic recording medium can be recorded using standard techniques onto the second web before or after the length of web is wound onto the master drum, using a recording head which touches the surface of the second, magnetic recording medium. The second medium can be removed and replaced if worn or damaged or if different information is to be recorded. An intimate interface can be achieved between the first and second, magnetic recording media at the edges of the first web for web speeds as high as 600 feet (182.88 m) per minute for webs as thick as 0.0056 inch (0.014 cm). The apparatus and the magnetic media can be readily manufactured using currently available manufacturing techniques and can be easily maintained. Recording along the edges of the first web is achieved, though recording in the central area of the first web also can be achieved by reconfiguring the vacuum ports and relocating the elastomeric medium and the second, magnetic recording medium. The apparatus and method permit recording onto a mechanically sensitive web such as photographic film without damage to the film's mechanical or photographic properties.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
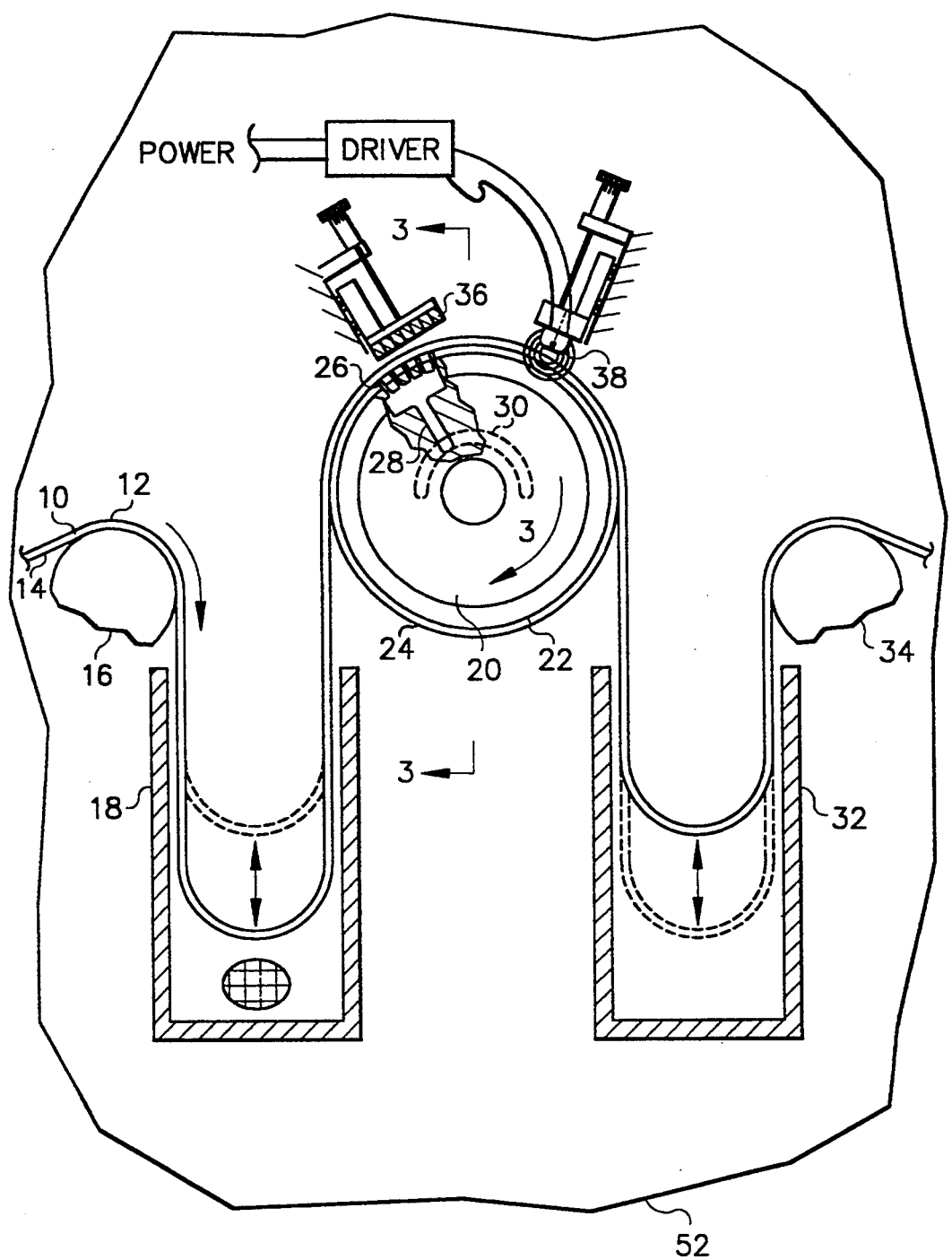
FIG. 1 shows a schematic elevation view of one type of apparatus for anhysteretic recording embodying the invention.

The following is a detailed description of the preferred embodiments of the invention, reference being made to the drawings in which the same reference numerals identify the same elements of structure in each of the several Figures.

Figure 2:
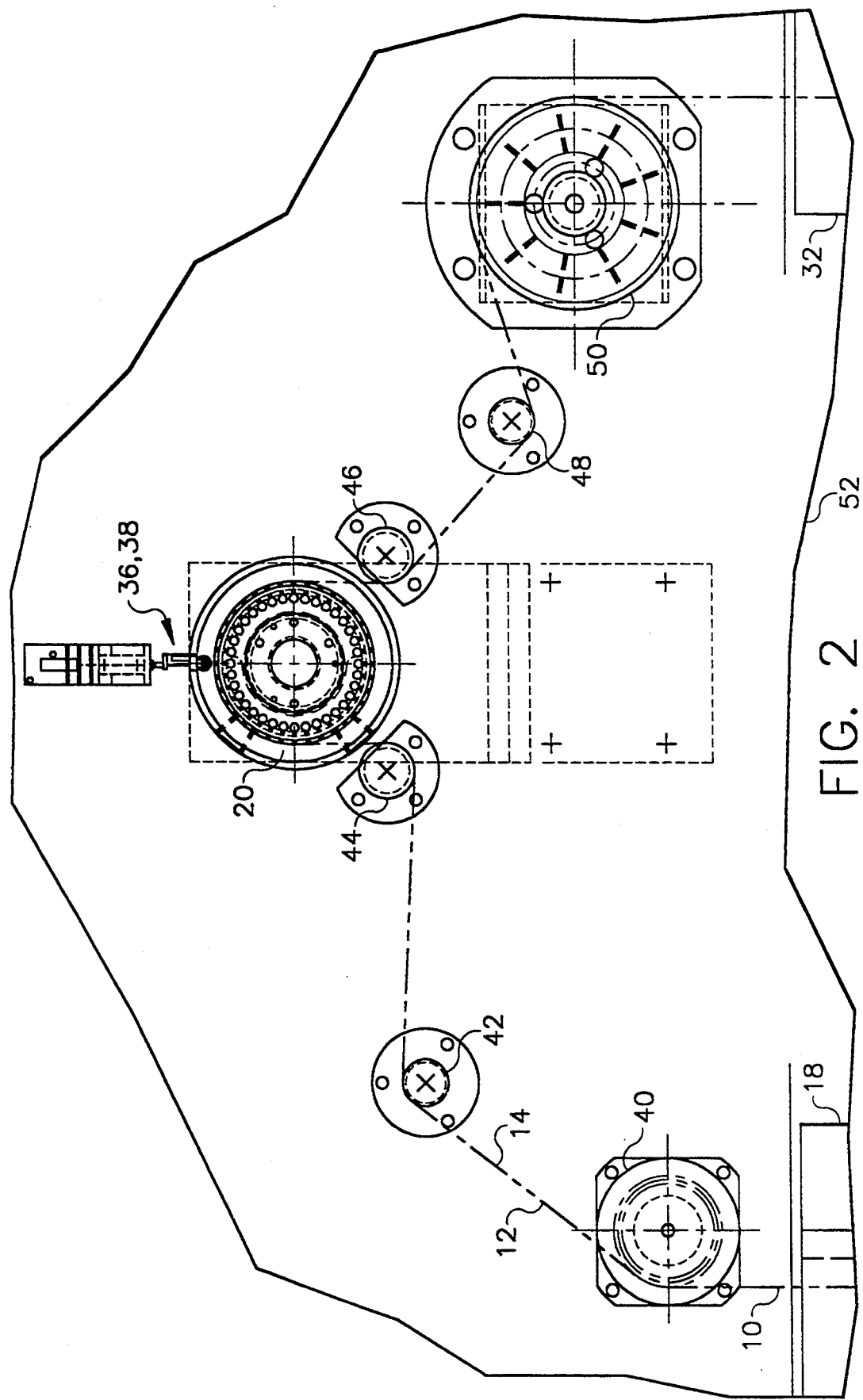
FIG. 2 shows a schematic elevation view of another type of apparatus for anhysteretic recording embodying the invention.
Figure 3:
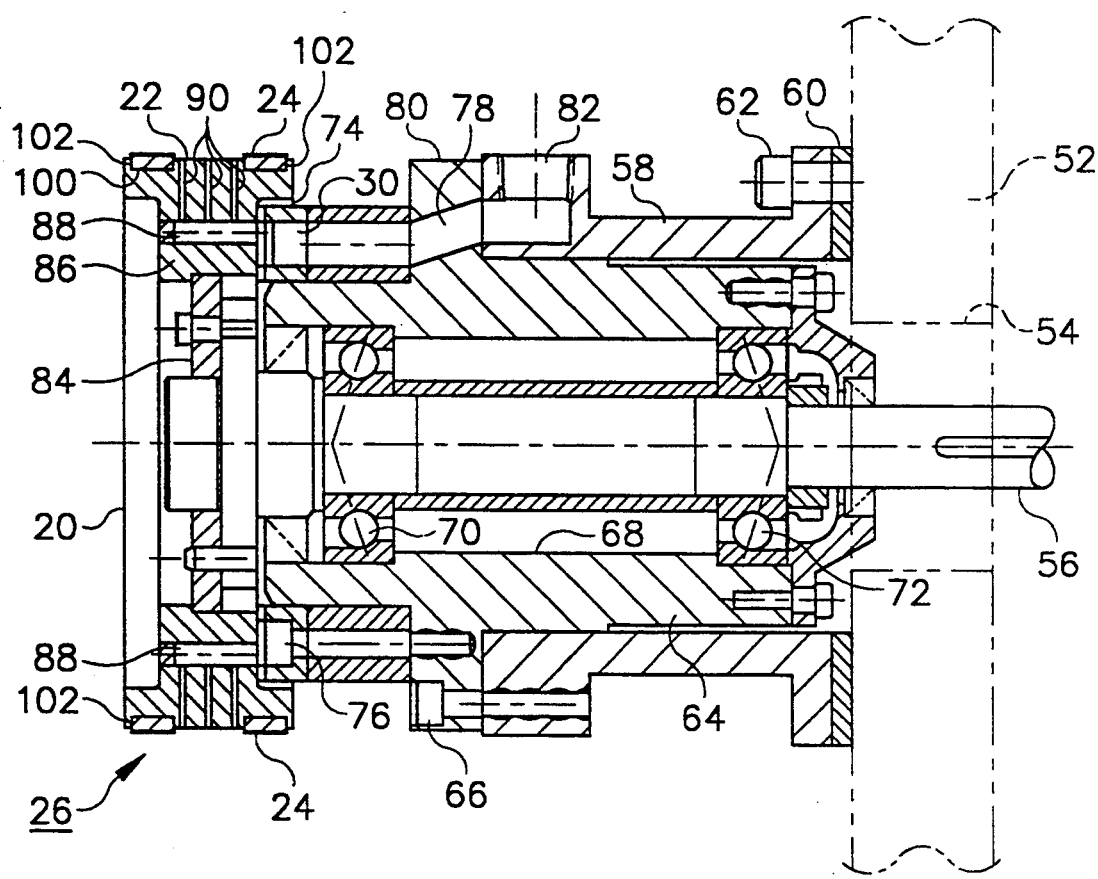
FIG. 3 shows an elevation section view taken along line 3—3 of FIG. 1, but with the first, magnetic recording medium omitted.
Figure 4:
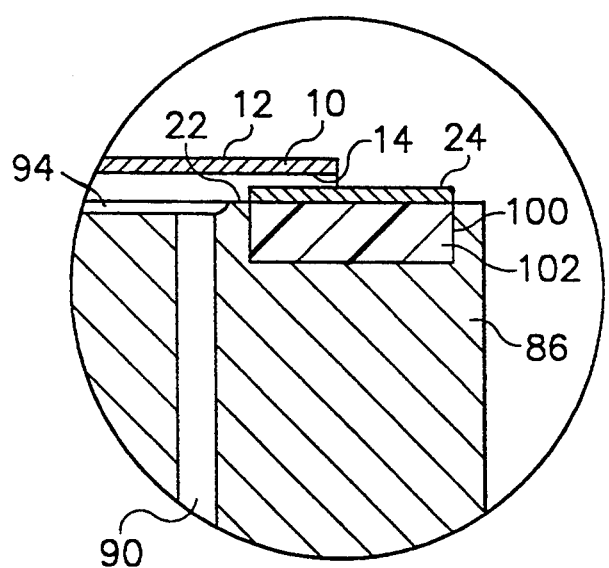
FIG. 4 shows an enlarged fragmentary section view of one edge of the recording drum, illustrating the locations of the elastomeric medium, the second, magnetic recording medium and the first, magnetic recording medium. For ease of illustration, a radial clearance is shown between the first medium and the recording drum; however, in operation no such clearance would exist.

As shown in FIGS. 1 and 2, the apparatus of the invention is particularly useful for recording onto a web 10 which comprises an acetate or plastic base having one side 12 with layers of photographic emulsions and another side 14 with a slave layer of a magnetic recording medium having a coercivity in the range of 500 to 1500 Oe. Web 10 is led into the apparatus of FIG. 1 over an air bar or roller 16 with emulsion side 12 facing outward and then downward into a conventional infeed vacuum box 18 which maintains tension on the web, preferably in the range of 0.5 to 1.25 pounds per inch (0.089 to 0.223 kg per cm) of web width. After leaving vacuum box 18, web 10 is wrapped approximately 180° around a circular, cylindrical vacuum and recording drum 20 according to the invention, which in the embodiment of FIG. 1 is driven at a constant speed by a motor, not illustrated. As seen schematically in FIG. 1, drum 20 comprises an exterior cylindrical surface 22 which supports at least one length 24 of web comprising a master magnetic recording medium, of a type to be described later in this specification. In a preferred embodiment of recording drum 20 as best seen in FIGS. 3, 4 and 6, a pair of lengths 24 extend as continuous circumferential bands, one along each circumferential edge of drum 20; however, a single band along one edge of the drum or a band more toward the center of the circumferential surface of the drum is also within the scope of the invention. A preferred method for applying lengths 24 will be discussed later in this specification. As will be discussed in detail with regard to FIGS. 3 to 7, surface 22 is precisely machined to include an array 26 of axially and circumferentially extending grooves and radially extending ports which are in communication with a plurality of interior channels 28 within drum 20, only one of such channels 28 being illustrated for simplicity. As shown in phantom lines in FIG. 1, such channels 28 communicate with a stationary interior porting unit having an approximately 180° exhaust port 30 connected to a suitable source of subatmospheric pressure. Thus, when surface 14 moves into contact with drum 20 opposite exhaust port 30, subatmospheric pressure is applied to the interface between surface 14 and surface 22 to remove entrained air via array 26 and thus to draw web 10 into intimate contact with surface 22 and lengths 24. Circumferential slip between web 10 and drum 20 also is eliminated. As drum 20 is rotated, it pulls web 10 along until channels 28 move out of communication with exhaust port 30, whereupon web 10 is released progressively from drum 20 to move into an outfeed vacuum box 32, from which it passes over a further air bar or roller 34 and out of the apparatus of the invention.

Infeed vacuum box 18 provides a web tensioning and slack takeup link between the constant velocity drum 20 and the source of supply of web 10, not illustrated. Those skilled in the art will appreciate that a servo system, not illustrated, can be used to monitor the position of the loop of web 10 in vacuum box 18 and then to control the source of supply of web 10 as necessary to maintain an essentially constant position of the loop. The same sort of control scheme can be applied at outfeed vacuum box 32, except that loop position is maintained by controlling the rate of takeup of web 10 downstream of air bar 34. Thus web 10 is removed from infeed vacuum box 18 and added to outfeed vacuum box 34 by the continuous, preferably constant velocity rotation of drum 20, which acts as a web metering device. Web tension could also be maintained with a simple dancer or accumulator mechanism, as will be understood by those skilled in the art.

While web 10 is being held in intimate contact with drum 20, a magnetic bias field is applied by either an array 36 of permanent bias magnets, of the type shown in commonly assigned, copending U.S. application Ser. Nos. 656,667 and 704,816 filed 19 Feb. 1991, or a conventional inductive bias head 38 or erase head of the type familiar to those skilled in the magnetic recording arts. For simplicity, both array 36 and magnet 38 are shown in FIG. 1, though only one or the other would be used in an actual production apparatus. Array 36 and magnet 38 may be mounted on suitable movable stages to permit adjustment of the magnetic gap, as illustrated schematically. Due to the presence of the bias field and the intimate contact between web 10 and drum 20, information previously recorded on lengths 24 is anhysteretically recorded onto the magnetic recording medium on side 14 of web 10. For apparatus using array 36, the speed of drum 20 during anhysteretic transfer may be varied and can be quite high. However, when head 38 is used, operating speed also may be varied but may be limited by the maximum frequency at which the head can be driven reliably.

FIG. 2 shows another anhysteretic recording apparatus embodying the invention. Here, web 10 passes from vacuum box 18 over an air bar 40, over a roller 42, beneath an air bar or roller 44 and then wraps approximately 180° around drum 20, which in this instance is mounted for rotation as an idler roll. That is, drum 20 is not driven by a separate motor but rotates in response to movement of web 10. From drum 20, web 10 passes beneath an air bar or roller 46, an air bar roller 48, and then wraps approximately 120° around a conventional, ported vacuum drum 50 which is driven at a constant speed by a motor, not illustrated, to pull web 10 through the apparatus. From metering drum 50, web 10 passes into out feed vacuum box 32 before leaving the apparatus. A control scheme similar to that previously described can be applied to this embodiment of the apparatus of the invention. The apparatus of FIG. 1 is preferred since it does not require the web to provide the torque needed to overcome the inertia of drum 20, as in the case of the apparatus of FIG. 2. Also, the apparatus of FIG. 2 tends to cause more variation in web tension than that of FIG. 1. In the embodiments of FIGS. 1 and 2, flanged rollers and edge guided air bars are used to provide good tracking and alignment to the vacuum drums.

Figure 5:
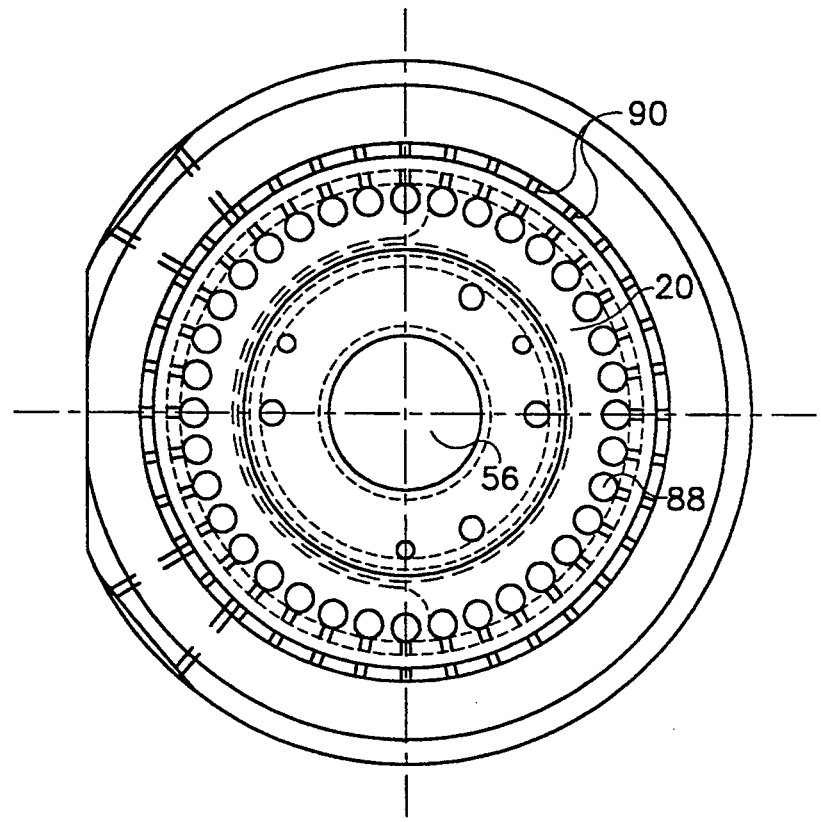
FIG. 5 shows an elevation view as seen from the left of FIG. 3.
Figure 6:
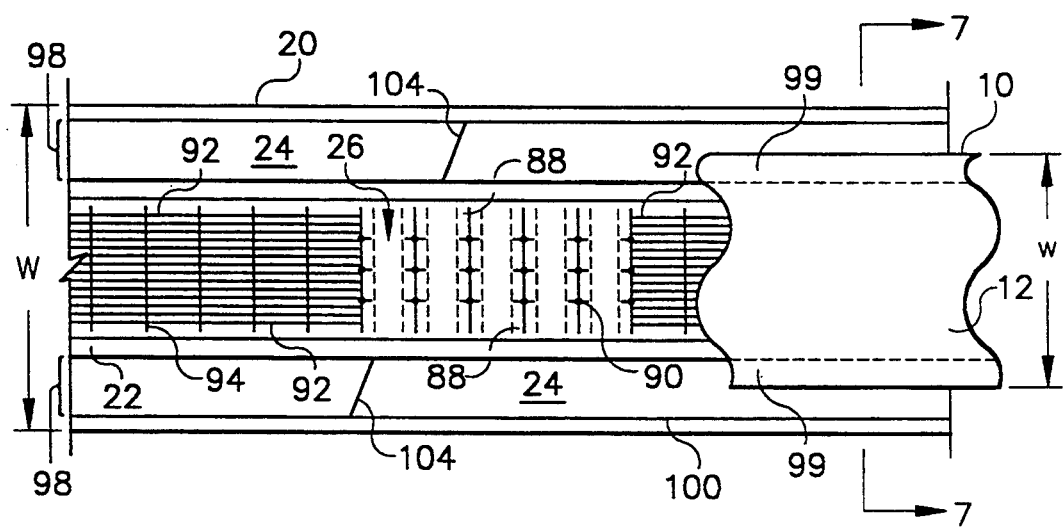
FIG. 6 shows a fragmentary projected view of the array of axial and circumferential grooves and radial bores provided in the cylindrical surface of the drum of FIGS. 3 to 5 and illustrates the positions of the grooves and bores relative to the first and second, magnetic recording media.
Figure 7:
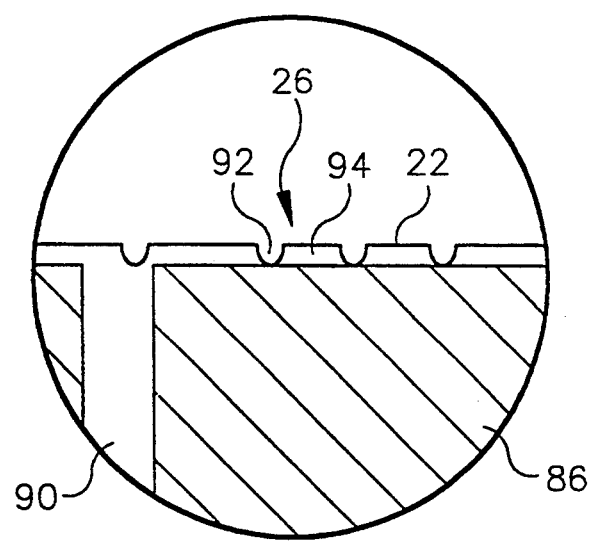
FIG. 7 shows a fragmentary section view taken along line 7—7 of FIG. 6.

Turning to FIGS. 3 and 5, the apparatus of FIGS. 1 and 2 is mounted on a rigid, typically vertical face plate 52, illustrated in phantom lines. A port 54 extends through face plate 52 to provide passage for the drive shaft 56 which rotates drum 20 in the embodiment of FIG. 1. In the embodiment of FIG. 2, no drive shaft is provided but the structure of drum 20 is otherwise the same. On the front side of face plate 52, a cylindrical housing 58 is mounted by means of a spacer plate 60 and a plurality of bolts 62. Within housing 58, a cylindrical bearing housing 64 is mounted by a plurality of bolts 66. A central bore 68 in bearing housing 64 supports a pair of bearings 70, 72 for shaft 56. Surrounding the front end of bearing housing 64 is a vacuum stator ring 74 which comprises an approximately 180° exhaust plenum 30, as discussed with regard to FIG. 1. A plurality of bolts 76 secure stator ring 74 to bearing housing 64. A passage 78 extends from exhaust plenum 30 through a flange 80 on bearing housing 64 and communicates with a connection port 82 for attachment to a source of subatmospheric pressure such as a vacuum pump, not illustrated. At the front end of shaft 56, a preferably stainless steel hub 84 is mounted by suitable fasteners. Hub 84 is press fitted into a bore within an annular titanium or aluminum vacuum drum rotor 86. Surface 22 preferably is right cylindrical but also could be contoured concavely to provide an increase in the normal force typically generated by tension in web 10. Such a contour would modify the tension profile in the web so that improved intimate contact would be established at the edges of the web where information transfer is to occur.

As shown in FIGS. 3 to 7, around the circumference of rotor 86 are provided a plurality of axial bores 88, corresponding in function to channels 28 shown schematically in FIG. 1, bores 88 being radially positioned to communicate with exhaust plenum 30 as drum 20 rotates, the opposite ends of bores 88 being plugged. The axial gap between stator ring 74 and rotor 86 is minimized to reduce vacuum leakage. A layer of a high lubricity material such as Teflon or Rulon, not illustrated, may be applied to the surface of stator ring 74 facing rotor 86, to reduce friction and provide a smooth wear-in surface should contact occur. Each axial bore 88 communicates with a plurality of radial bores 90 which preferably are approximately 0.031 inch (0.079 cm) in diameter and extend outward through surface 22. On the cylindrical surface of drum 20, array 26 preferably comprises a plurality of circumferential grooves 92 which preferably are 0.013 to 0.017 inch (0.033 to 0.043 cm) wide, 0.005 to 0.010 inch (0.0127 to 0.0254 cm) deep and spaced on a 0.052 inch (0.132 cm) pitch. Grooves 92 are intersected at bores 90 in an orthogonal array by a further plurality of axial grooves 94 which preferably are 0.010 inch (0.0254 cm) wide, 0.010 to 0.015 inch (0.0254 to 0.038 cm) deep and spaced on a 0.350 inch (0.889 cm) pitch. Other patterns of radial bores, axial grooves and circumferential grooves may be used without departing from the scope of the invention. In FIG. 6, a length of the circumferential grooves has been omitted to show more clearly the relative positions of bores 88 beneath axial grooves 94. As shown schematically in FIG. 6, a web 10 of width w preferably is somewhat narrower than the width W of drum 20. The presence of bores 90 and grooves 92, 94 could interfere with recording onto lengths 24 of master magnetic recording medium and with transfer of information from lengths 24 to slave magnetic layer 14. So, array 26 preferably is confined to the central portion of the exterior cylindrical surface 22 of drum 20, thus leaving on each edge of the cylindrical surface an annular zone 98 which preferably is wide enough to provide sufficient space for mounting of lengths 24 of master recording medium. When web 10 is wrapped onto drum 20, application of vacuum through bores 90 and grooves 92, 94 causes partial evacuation of air from between magnetic layer 14 and the surface of drum 20, thereby causing lengths 24 mounted in each of annular zones 98 to form an intimate interface with side 14 of web 10 to permit anhysteretic transfer of information from the master to the slave. That is, the radial clearance shown for ease of illustration in FIG. 4 is eliminated upon application of vacuum to array 26. Preferably, the edges of web 10 are positioned essentially mid-way of the widths of lengths 24; however, the edge of web 10 may also extend beyond lengths 24. Preferably, a vacuum in the range of 15 to 25 inches (38.1 to 63.5 cm) of mercury is applied to ensure removal of entrained air and the necessary intimate contact. The vacuum applied is best at the center of array 26 but extends beyond the circumferential and axial grooves partially across annular zones 98 to ensure good contact with edge bands 99 on web 10. The quality of the vacuum achieved beneath web 10 can vary as a function of applied tension, anticlastic effect, curl induced in web 10 by relative humidity, edge burrs and the like. Preferably, a vacuum in the range of about 25 inches (38.1 to 63.5 cm) of mercury is applied at connection port 82 to ensure removal of entrained air and the necessary intimate contact.

Lengths 24 of master magnetic recording medium preferably comprise an intrinsically high coercivity magnetic medium applied to a polyester support. As shown in FIGS. 3, 4 and 6, an annular circumferential groove 100 is provided along each edge of drum 20 and an annular band 102 of an elastomeric material is provided within each groove 100. The compliant drum surface helps to attenuate the effects of anticlastic edge curl and edge burrs, by allowing the drum to partially conform to the edge geometry of the medium, thereby providing an improved contact pattern. On a drum 20 having a diameter of about 4.0 inches (10.16 cm) and an axial width of about 2.0 inch (5.08 cm), groove 100 was about 0.09375 inch (0.238 cm) deep and about 0.5 inch (1.27 cm) wide. The width of groove 100 may be varied to accommodate various widths of lengths 24. Preferably, grooves 100 are positioned so that the edges of web 10 will be essentially midway of each band 102 and length 24 of the second, magnetic recording medium. Although it is preferred that grooves 100 be closed at their axial ends, it is also within the scope of the invention to provide grooves open to the ends of rotor 86. A process for applying such an elastomeric material is disclosed in copending, commonly assigned, allowed U.S. application Ser. No. 792,315 filed 14 Nov. 1991. Preferably, the elastomeric material has a Shore A hardness in the range of approximately 10 to 40 durometer, most preferably 20 to 25 durometer. In the one embodiment, a 0.09375 inch (0.238 cm) thick layer of low durometer polyester polyurethane was cast into circumferential groove 100. Band 102 is preferably applied to rotor 86 through a conventional casting process; however, it is also within the scope of the invention to cast band 102 separately and then adhere or otherwise attach it within groove 100. After band 102 has been applied within groove 100, conventional grinding techniques may be used to produce the desired surface finish and to obtain symmetry around the circumference of drum 20, so that surface 22 and the outer cylindrical surface of band 102 are concentric and of approximately the same radius. In one embodiment, the surface of the band 102 was ground to 16 RMS.

Lengths 24 having the same widths as annular bands 102 are mutually adhered to bands 102 by wrapping them around drum 20 and trimming their ends to form smooth butt joints 104, as shown in FIG. 6. As will be discussed in further detail, care must be taken when wrapping lengths 24 onto drum 20 to exert an essentially constant tension, in order to avoid differential stretching of the lengths which may influence their magnetic recording characteristics. Since lengths 24 are very thin, about 0.00025 to 0.0035 inch (0.00064 to 0.0089 cm), their extending above surface 22 does not interfere with establishing a good contact with surface 14 of web 10. To form the butt joints, a piece of metallic shim stock may be used as an anvil to cut lengths 24. Thin stainless steel strip approximately 0.001 inch (0.00254 cm) thick is preferred since it provides some flexibility to conform to the curvature of drum 20. The shim stock is used to support a length of the master magnetic recording medium as it is cut; therefore, length 24 initially needs to be large enough to cover the area over which a desired butt joint will be made.

A first end of the length 24 is placed on annular band 102 and the rest of the length is wrapped circumferentially around drum 20. A slight, essentially constant tension is applied to provide a smooth, secure fit. For example, 0.5 lbs. (1.1 kg) tension is suitable for lengths 24 which are 0.5 inch (1.27 cm) wide and comprise a polyester base approximately 0.003 inch (0.008 cm) thick. An appropriately sized piece shim stock then is placed on annular band 102 under the first end of length 24 in the area where the second end of the length will overlap and the butt joint will be formed. Since the shim stock is thin and flexible, it conforms to the shape of drum 20, allowing length 24 to be positioned snugly against the surface of annular band 102. While maintaining tension on the second, outer end, a sharp knife is used to cut through both ends of length 24 above the shim stock. As shown in FIG. 6, a diagonal butt joint 104 may be made. The shim stock and the waste pieces of length 24 are then removed; so that, the ends of length 24 will adhere directly to the elastomeric material of annular band 102, thereby forming a precision butt joint with a minimal gap. The resulting compliant magnetic drum provides continuous smooth surfaces for lengths 24 with radial compliance due to the elastomeric material and circumferential stiffness due to the lengths 24. Yet no separate mechanical elements are required to secure lengths 24 to drum 20. Successful recording from the master medium to the slave medium has been achieved as close as 0.020 inch (0.051 cm) to the edge of the slave medium, beyond which the anticlastic effect appeared to interfere with recording. For a given slave medium, the degree of anticlastic curl can be reduced by increasing the diameter of the recording drum.

Lengths 24 and annular bands 102 are mutually adherent because the inherent surface free energy of the two materials permits the formation a secure bond. Although a good bond has been observed between polyester polyurethane in annular bands 102 and a polyester base for lengths 24, the use of other material couples is appropriate, where the surface free energies of the two materials are chosen to form such a secure bond; and where the hardness of the elastomeric material for annular bands 102 falls within the range previously discussed. This type of construction allows renewal of the master magnetic recording medium by removing the present length 24 and replacing it with a fresh length of master magnetic recording medium. However, it should be noted that the adherence between the elastomeric material and lengths 24 tends to increase with time, eventually making removal more difficult.

The butt joint for strip 10 can be in a diagonal or axial direction. FIG. 6 illustrates diagonal butt joints 104. As shown, each length 24 is discontinuous at the location of the butt joint. Accordingly, the loss of magnetic data may occur in this region. Therefore it may be desirable to use drum 20 such that less critical or no data is recorded in this region. The geometry of the butt joint may assist in minimizing the loss of magnetic data in this splice region. For example, if the data on drum 20 is read circumferentially, diagonal joint 104 would produce only a partial loss of data at any discrete circumferential position; whereas a straight butt joint, not illustrated, would produce a total loss of data at one discrete circumferential position.

The strength of the bond formed between the base of length 24 and the elastomeric material of annular band 102 is influenced by the surface finish of band 102. The strongest bond has been observed on an unground, as cast elastomeric layer having a surface finish preferably less than 8 RMS. By grinding the outer diameter of band 102, reduced radial runout may be obtained; but the adhesion strength between length 24 and annular band 102 is decreased as the surface of band 102 is roughened. In one embodiment, the surface of band 102 was ground to 16 RMS, yet the decreased level of adhesion was found to be quite adequate.

The thickness of length 24 also affects the bond to band 102, especially at the butt joint. Thinner materials, approximately 0.00025 to 0.0035 inch (0.00064–0.0089 cm) thick have less core set memory associated with circumferential beam stiffness and are therefore less likely to lose contact at the butt joint, compared to thicker materials of approximately 0.0045 inch (0.0114 cm) thickness. Therefore, lengths 24 made from such thicker materials may tend to unwrap themselves from band 102 at the butt joint, especially when length 24 is applied in the opposite rotational direction of its original core set.

A process for preparing and coating such a master magnetic recording medium onto lengths 24 is disclosed in commonly assigned, copending, allowed U.S. application Ser. No. 07/811,386 filed 20 Dec. 1991. For example, polyester supports for the master magnetic medium are generally about 0.003 inch (0.0076 cm) thick, or two to four times thicker than previously known master tapes for anhysteretic recording. This provides the master medium or media with a robustness and durability as well as superior handling and transport characteristics. The master media are also capable of transferring recorded signals efficiently and effectively to receiving media having coercivities higher than those used heretofore. This may in part be due to the ability to record at lower frequencies or longer wavelengths than video tapes or masters. The ratio of coercivity of master to slave is about 2 to 1.

Coating compositions for the master media on lengths 24 can be prepared using any suitable materials of the classes specified herein or mixtures thereof and any suitable equipment. Generally, from about 59–69%, preferably 64–67%, most preferably 67 dry weight % of any suitable magnetic pigment mixture can be used to prepare the coating compositions of the invention. Total pigment content greatly influences the physical properties of the tape. Too low a pigment content (binder rich) gives higher stick-slip tendency when the tape is run against a recording head, or against various transport mechanisms that move and direct the tape. Too high a pigment content produces a tape that is fragile because it is too brittle. The relationship between magnetic pigment content and electrical properties is straightforward: the higher the pigment content, the higher the electrical signal. Also, the higher the abrasive pigment content (e.g. alumina) and the larger the abrasive particles, the greater the contribution of the media to the total electrical noise. This kind of noise, however, does not appear to impact the performance of the master media since the wavelength of the magnetic information is significantly greater than the abrasive particle diameter.

A useful magnetic particle for the magnetic media has a coercivity, Hc, equal to or greater than about 2000 Oe, the highest possible saturation magnetization (emu/9), and a specific surface area (SSA) ranging from about 50–60 m$^2$/g. Any suitable pigment can be used including pure iron or an alloy of Fe, Co, Ni, Co—Ni, Co—Pt, Co—Ni—Pt, Fe—Co, Fe—Ni, Fe—Ni—Co, Fe—Co—B, Co—Ni—Fe—B, Co—Cr, chromium dioxide, doped, modified, coated magnetic particles or pigments and mixtures thereof. Metallic iron, preferably needle-like particles having a metallic iron core surrounded by a passivity shell of iron oxide (largely $Fe_2O_3$) which prevents the particle from spontaneously catching fire when exposed to air, is preferred. The magnetic properties of such particles can be thought to be a weighted average of the properties of pure iron and the iron oxide. Pferromet PK2000, available from Harcross Pigments, Easton, Pa. 18042-1497, is an example of a most preferred pigment.

The magnetic pigment, abrasive powder, and colloidal inorganic powder, are first wetted with a suitable solvent using any suitable wetting agent or dispersant. Components such as the abrasive powder and/or the colloidal inorganic, which is preferably carbon black, can be added as dry powders but are preferably added as predispersed slurries. Preferably, the abrasive dispersion is stabilized with a small amount of the hydroxy terminated polyurethane binder to be employed. Generally, amounts of the polyurethane as small as from about 2–4 weight percent based on the weight of the solids in the abrasive dispersion are adequate. The use of a small amount of a wetting agent as defined herein has also been found advantageous. Generally, amounts as small as from about 1–3 weight percent of wetting agent based on the weight of the solids in the abrasive dispersion are adequate.

Generally, from about 2.95 to about 6.9%, preferably 3.8–5.4%, most preferably 5.36 dry weight %, of any suitable abrasive material can be employed. Typically, fine inorganic particles are used such as, for example, aluminum oxide, silicon carbide, chromium trioxide, diamond, artificial diamond, garnet, emery and the like and mixtures thereof having an average particle diameter of from about 0.1 to about 2 microns and a specific surface area (SSA) ranging from about 1 to about 15 m$^2$/g can be used. Alumina, particularly crystalline alpha alumina is preferred because it has the appropriate hardness and shape, is readily dispersible, and widely available in the preferred 0.1–0.6 micron diameter range which allows the tops of the particles to protrude from the tape surface and exert their "cleaning" action on the head.

Up to about 5.4%, preferably 1–3%, and most preferably 1.34 dry weight %, of any suitable colloidal inorganic powder and mixtures thereof can be used in the preparation of the coating compositions provided that carbon black is a component thereof. Preferably, up to about 2.68%, preferably 1.34 dry weight % of colloidal carbon (carbon at 43 m$^2$/g) is used as the colloidal inorganic powder. Conductive carbon black, furnace carbon, channel carbon, acetylene carbon, thermal carbon, lamp carbon, commercially available carbon blacks such as Elftex 12, Sterling R, and Cabot XC-72 (Cabot Corp, Boston, Mass. 01821) and Accufluor CFx (Allied Engineered Materials, Morristown, N.J. 07960), and the like and mixtures thereof are preferred.

Inorganic pigments, conductors, extenders and the like such as alumina having a particle diameter of from about 0.01 to about 0.04 micron and a specific surface area (SSA) ranging from about 20 to about 300 m$^2$/g can also be used as an inorganic colloidal component. Alpha FeOOH, alpha Fe$_2$O$_3$, Cr$_2$O$_3$, TiO$_2$, ZnO, SiO$_2$, SiO$_2$.2H$_2$O, Al$_2$O$_3$.2SiO$_2$.2H$_2$O, 3MgO.4SiO$_2$.H$_2$O, CaCO$_3$, MgCO$_3$, Sb$_2$O$_3$ commercial counterparts such as Aluminium Oxid C, Aerosil 200, and Aerosil 972 (Degussa Corp, Pigments Div, Teterboro, N.J. 17608) and the like and mixtures thereof and the like can also be used. Alumina, particularly less dense gamma-Al$_2$O$_3$, is preferred, e.g., Oxid C. The colloidal inorganic materials improve durability and control surface roughness. They are too small to act as abrasives but capable of acting as spacers, as extenders to reinforce the polymer matrix, or as dispersion aids.

Generally, from about 2.9 to about 4.5%, preferably 3.3–4.5%, most preferably about 3.8 dry weight %, of any suitable wetting agent and mixtures thereof can be employed. As used herein, the term wetting agent is intended to include dispersants and any other expedients which facilitate the dispersion of the magnetic particles and other components of the coating compositions in solvent provided that one component of the wetting agent is a phospholipid, preferably lecithin, and another is a complex organic phosphate fatty acid ester, preferably a mixture of mono- and di-alkarylpolyoxy ethylene phosphoric acid esters.

Most preferably, the wetting agent includes a mixture of mono and diesters of the formulae $$RO-[CH_2CH_2O]_n-\overset{\overset{O}{\|}}{\underset{\underset{OH}{|}}{P}}-OH$$

$$RO-[CH_2CH_2O]_n-\overset{\overset{O}{\|}}{\underset{\underset{[OCH_2CH_2]_n-OR}{|}}{P}}-OH$$

wherein R is

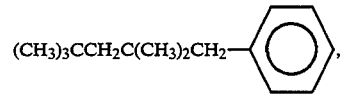

$(CH_3)_3CCH_2C(CH_3)_2CH_2-$ and n is 9. Preferably the ratio of mono to diester ranges from about 3–6 to 1 (average ratio about 4–1), so that the effective molecular weight of the mixture is about 815.8 g/mol. In the most preferred coating composition, the wetting agent comprises 2.9–4.14 dry weight % lecithin, preferably 3.55%, and a trace amount (0–0.72 dry weight %) of the phosphoric acid ester mixture described above, preferably 0.11%. Other suitable wetting agents that can be used include dodecylbenzenesulfonic acid and any of the wetting agents disclosed, for example, in U.S. Pat. No. 4,407,901 which is hereby incorporated herein by reference. Lecithin and acid phosphate esters such as Gafac RE610 (GAF Corp, NY, N.Y., 10020) are preferred since they provide excellent dispersions without interfering with the crosslinking reaction, particularly at the preferred concentrations.

Some materials which operate as lubricants as well as suitable wetting agents include, for example, fatty acids having alkyl or alkenyl groups having 11 to 17 carbon atoms including caprylic acid, capric acid, lauric acid, myristic acid, palmitic acid, stearic acid, oleic acid, elaidic acid, linoleic acid, stearolic acid, and the like; an ester of the above fatty acids having, for example, from 1 to 20 carbon atoms in the ester group, preferably 1 to 4, such as methyl laurate, butyl myristate, ethyl linoleate, propyl stearate, butyl palmitate, and the like; a metallic soap of the above fatty acids with an alkali metal such as lithium, sodium, potassium and the like or an alkaline earth metal such as magnesium, calcium, barium and the like; a compound containing fluorine of the above fatty acid esters, amides of the above fatty acids, polyalkylene oxide alkyl phosphoric acid esters, trialkyl polyolefinoxy quaternary ammonium salts, particularly those having alkyl groups having from 1 to 5 carbon atoms; polyolefins such as polyethylene, polypropylene, and the like; higher alcohols having 12 or more carbon atoms; sulfuric acid esters and so on.

Any suitable solvent can be employed in the preparation of the coating compositions. Generally from about 60 to about 75%, preferably about 68% by weight of solvent based on the total weight of the dispersion, of any organic solvent or solvent mixture normally used for the preparation of dispersions is suitable for this purpose. Some suitable solvents include ketones such as methylethylketone, methylisobutylketone, cyclohexanone; alcohols; esters such as methyl acetate, ethyl acetate, butyl acetate, ethyl lactate, cellosolves; ethers such as acetic acid glycol monoethyl ether, glycol dimethylether, glycolmonoethylether, dioxane; aliphatic and aromatic hydrocarbon solvents such as benzene, toluene, xylene, tetrahydrofuran, hexane, heptane; chlorinated hydrocarbons such as methylene chloride, ethylene chloride, carbon tetrachloride, chloroform, ethylene chlorohydrin, dichlorobenzene, and the like and mixtures thereof. Cyclohexanone, methylethylketone, tetrahydrofuran, and toluene are preferred and a mixture of from 1–2 parts of tetrahydrofuran, 59–63 parts of methylethylketone, 30–33 parts of cyclohexanone, and 6 parts of toluene is most preferred.

Any other suitable solvent or solvent mixture can be used that will dissolve binders, lubricants and other organic species and keep them dissolved until the coating is almost completely dry. The solvent should evaporate at a proper rate given the coating speed and dryer conditions used, with some slight solvent retention to assist during calendering. In combination with dispersants, the solvent should wet the pigments in the dispersion, have low toxicity, low cost, be easy to recover, and evaporate slowly during the milling and filtering operations. A combination of tetrahydrofuran, methylethylketone, cyclohexanone, and toluene worked well.

Preferably, the magnetic pigment, abrasive powder, colloidal inorganic powder, and wetting agent are wetted with the solvent and dispersed therein using a high speed disk disperser such as a Cowles blade fixed to a shaft, preferably operated at a minimum tip speed of about 4000 ft/min. The wetting/dispersing operation is preferably carried out in an inert atmosphere containing no more than about 5% oxygen, preferably 1-3% oxygen, using a glove box or any other such suitable expedient, preferably equipped with a monitoring device to assist in oxygen manipulation and an alarm bell. Caution is observed during this operation since metallic iron particles of high surface area are pyrophoric and are being introduced into a large quantity of highly flammable organic solvent.

The wetting/dispersing operation is continued for a suitable time, generally from about 1 hour to about 48 hours, and preferably about 24 hours when the preferred components are employed. Preferably, the wetting/dispersing operation is continued until aggregates no larger than about 0.1 mm are obtained. This not only assists the media milling process but also insures that no large, dry clumps of pigment have escaped being wet with solvent.

The proportions of the components in a typical wet-out composition are generally as follows:

|  | range | g total preferred | % of dry weight range | preferred |
|---|---|---|---|---|
| SOLIDS | | | | |
| Magnetic pigment | 443.0-464.2 | 450 | 85-89 | 86.49 |
| Abrasive powder | 18.2-51.2 | 36 | 3.5-10 | 6.91 |
| Colloidal | 0-41.7 | 9 | 0-8 | 1.73 |
| Wetting agent | 10.4-36.5 | 25.47 | 2-7.2 | 4.88 |
| Total dry | - | 520.49 | | 100.00 |
| SOLVENTS | | | | |
| Methylethylketone | 400-550 | 506.22 | | |
| Cyclohexanone | 350-500 | 404.96 | | |
| Toluene | 50-200 | 101.24 | | |
| Tetrahydrofuran | 0-100 | 0 | | |
| Total Solvent | | 1012.42 | | |
| Total Weight | | 1532.89 | | |
| Percent Solids | | 34.00 | | |

The wet-out composition is then milled (which term is intended to include grinding, kneading and any other such suitable operations) in any suitable apparatus such as a small media mill, bead mill, Eiger mill, Netzsch mill, or the like. The milling apparatus is preferably loaded with glass beads (e.g., diameter of 1.0 to 1.3 mm). Milling is carried out carefully in such a manner as to avoid breaking particles due to overmilling. A B/H meter can be used to record the hysteresis loops in order to monitor the dispersion. Initially, the metal pigment particles are tightly aggregated, even sintered, but are individually porous and fragile once separated. The consequence of breakage is to produce small particles of low coercivity which would switch in the applied transfer field and be useless in the practice of the invention. Such particles dilute the effective particles in the tape product resulting in lower signal-to-noise ratios. Particles can be broken using too long a residence time (too many passes, too long total milling time), too high a tip speed (rpm), substitution of steel or ceramic beads for glass beads, lower mill base viscosity (lower solids, higher dispersant levels), and so on. Under-milling produces poor filterability because pigment is stripped from dispersion as filter cake with the result that the tape product contains a lower pigment concentration than intended.

The aim of the dispersion process is to reduce the aggregates of metal particles (which have a primary particle length of preferably about 0.2 micron) by orders of magnitude in size. For example, if the original dry metal pigment granules are 5-10 an (500010,000 micron), then the diameter of the wet-out pigment aggregates may be 0.1 mm (100 micron) and the milled pigment may be less than 5 and usually less than 1 micron in diameter to provide thin coatings. To achieve this, the composition is milled or ground in a small media mill for about 3 hours at about 14 meters/sec tip speed and filtered through a 5 micron filter. Particular attention should be paid to the RPM or tip speed of the mill and the time or number of passes through the mill.

The grind phase composition which is the same as the wet-out composition is then "let down" with a binder solution, lubricant, and crosslinking agent added slowly to the grind composition. The "let down" should be carried out as slowly and with as much stirring/shear action as practical. Simply dumping the binder solution into the grind phase composition can produce "colloidal shock" which is a reaggregation phenomenon that may be irreversible, even with additional milling. In a system already sensitive to overmilling, colloidal shock can be catastrophic.

Preferably, the binder is added first followed by lubricant, crosslinking agent, and other minor additions which may be desired. Binder solutions preferably have a solids content ranging from about 10-25% in any suitable solvent, including any of those already described herein (75-90% solvent). Generally from about 14.12 to about 33.56%, preferably from about 18.73 to about 22.71%, most preferably about 18.87 dry weight % of the coating of any suitable polyurethane binder can be used, preferably an hydroxyl terminated polyurethane, more preferably an hydroxy terminated polyester polyurethane, most preferably an hydroxy terminated polyethylene terephthalate polyurethane. The polyurethane preferably has a molecular weight ranging from about 10,000 to about 200,000, more preferably a number average molecular weight (mn) of from about 20,000 to 50,000, most preferably a minimum $m_n$ of from about 25,000 to about 30,000.

Some suitable polyurethanes which can be used include those prepared by reacting isocyanates with an excess of compounds containing active hydrogen atoms such as polyhydroxy polyols, polyesters, polyethers, polyetheresters and the like. Long chain diols and short chain glycols can be used such as polyester diols, polycarbonate diols, polyether diols and the like. Preferred are polyester diols obtained by the polycondensation of a polybasic acid such as adipic acid, succinic acid, azelaic acid, sebacic acid, phthalic acid, isophthalic acid, terephthalic acid and the like with a polyhydric alcohol such as 1,4butanediol, ethylene glycol, diethylene glycol, propylene glycol, 1,2-propylene glycol, dipropylene glycol, 1,6-hexane glycol, cyclohexanedimethanol, neopentyl glycol and the like or lactone-type compounds obtained by ring-opening polymerization of a lactone such as epsilon caprolactone. Polyesters of adipic acid, isophthalic acid, hexanediol, cyclohexandimethanol and butanediol are preferred. Particularly preferred is a mixture of a polyester of adipic acid, isophthalic acid and hexanediol (36:14:50 mol %) and cyclohexanedimethanol or an 85:15 mol % mixture of a polyester of adipic acid, isophthalic acid, hexanediol and cyclohexanedimethanol (25:10:35:30 mol %) and hexanediol and/or cyclohexanedimethanol. Most preferred are polyesters which contain units derived from butanediol and adipic acid. Preferred polycarbonate polyols are prepared by the polycondensation of 1,6-hexanediol with diethyl carbonate or diphenyl carbonate. Preferred polyether polyols include polyethylene ether glycol, polypropylene ether glycol, polytetramethylene ether glycol, copolymerized polyether glycol of polytetramethylene ether glycol and the like.

Any suitable isocyanate can be reacted with the active hydrogen containing compound to prepare the polyurethane binder of the coating compositions including polyisocyanates prepared by reacting an excess of a polyisocyanate with a polyhydroxy compound including aromatic, aliphatic, alicyclic, alkaryls, aralkyls, and the like and mixtures thereof. Preferred polyisocyanates include organic diisocyanates such as tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compound such as polyols, polyethers and polyesters and the like including ethylene glycol, propylene glycol, dipropylene glycol, butylene glycol, trimethylol propane, hexanetriol, glycerine, sorbitol, pentaerythritol, castor oil, ethylenediamine, hexamethylenediamine, ethanolamine, diethanolamine, triethanolamine, water, ammonia, urea and the like, including bioret compounds, allophanate compounds and the like. Tolylene diisocyanate and diphenylmethane diisocyanate are preferred.

From about 0.01 to about 5.03%, preferably from about 0.01 to about 2.68 dry weight %, most preferably 2.1 dry weight based on the dry weight of the coating, of any suitable polyisocyanate crosslinking agent can be employed including any of those polyisocyanates described above and particularly polyisocyanates prepared by reacting an excess of a polyisocyanate with any suitable polyhydroxy compound as disclosed above. Preferred polyisocyanate crosslinking agents have a molecular weight ranging from about 150 to about 7,000. Most preferred is an adduct of trimethylol propane and tolylene diisocyanate. The crosslinking agent is preferably added in solution at any desired concentration in one of the coating composition solvents.

As used herein, the term "crosslinking" refers to reaction between isocyanate groups and ambient water to form an inter-penetrating polymer network. An effective amount of any suitable catalyst which will initiate the NCO/HOH reaction can be used to catalyze the crosslinking reaction including stannous octoate, stannous oleate, dibutyltin dilaurate, tertiary amines, ferric acetonyl acetate, and the like and mixtures thereof.

Generally from about 0.7 to about 3.1%, preferably 0.8 to about 2.3%, most preferably 1.54 dry weight % of any suitable lubricant can be employed in the preparation of the coating compositions provided that the lubricant provides a suitable coefficient of friction and provided that one of the lubricants is a fatty acid and another is a fatty acid ester. A static coefficient of friction of 0.1 to about 0.3 and a dynamic coefficient of friction of from about 0.04 to about 0.1 are preferred.

Any suitable fatty acid and fatty acid ester can be used in a preferred embodiment with butyl myristate and myristic acid preferred. Most preferably, about 0.77 dry weight % of butyl myristate and about 0.77 dry weight % of myristic acid are employed. The lubricant is preferably added in solution at any desired concentration in one of the solvents.

Some other suitable lubricants include, for example, fatty acids having alkyl or alkenyl groups having 11 to 17 carbon atoms including caprylic acid, capric acid, lauric acid, myristic acid, paimitic acid, stearic acid, oleic acid, elaidic acid, linoleic acid, stearolic acid, and the like; an ester of the above fatty acids having, for example, from 1 to 20 carbon atoms in the ester group, preferably 1 to 4, such as methyl laurate, butyl myristate, ethyl linoleate, propyl stearate, butyl palmitate, and the like; a metallic soap of the above fatty acids with an alkali metal such as lithium, sodium, potassium and the like or an alkaline earth metal such as magnesium, calcium, barium and the like; a compound containing fluorine of the above fatty acid esters, amides of the above fatty acids, polyalkylene oxide alkyl phosphoric acid esters, trialkyl polyolefinoxy quaternary ammonium salts, particularly those having alkyl groups having from 1 to 5 carbon atoms; polyolefins such as polyethylene, polypropylene, and the like; higher alcohols having 12 or more carbon atoms; sulfuric acid esters and so on.

The component additions are made slowly to avoid "colloidal shock" as described above and the dispersion is milled for a short period of time, preferably from about 15 to about 30 minutes, in a polishing step. For smooth, uniform, and durable tapse, the polished dispersion must be filtered, preferably through a 5 micron "absolute" PALL filter (available from PALL Trinity Corp., Cortland, N.Y., 13045), before it is coated onto a suitable support.

The proportions of the components in a typical letdown composition are as follows:

| SOLIDS | g added range | g added preferred | g total preferred | % dry weight preferred |
|---|---|---|---|---|
| Magnetic pigment | 0 | 0 | 450 | 67 |
| Abrasive powder | 0 | 0 | 36 | 5.36 |
| Colloidal | 0 | 0 | 9 | 8.34 |
| Wetting agent | 0 | 0 | 25.47 | 3.8 |
| Lubricant | 5–30 | 10.34 | 10.34 | 1.54 |
| Binder | 80–200 | 125.67 | 125.67 | 18.87 |
| Crosslinker | 1–20 | 14.08 | 14.08 | 2.10 |
| Total Dry | | | | 100.01 |

| SOLVENTS | g added preferred | g total preferred |
|---|---|---|
| Tetrahydrofuran | 34.54 | 34.54 |
| Methylethylketone | 512.76 | 1018.98 |
| Cyclohexanone | 164.97 | 598.94 |
| Toluene | 2.38 | 103.62 |

| -continued | | |
|---|---|---|
| Total solvent | 714.65 | 1727.08 |
| Total Weight | | 2398.72 |
| Percent Solids | | 28.00 |

The dispersions can be coated at any suitable thickness onto any suitable support or substrate having any suitable thickness using any suitable method. Preferably the dispersion is coated onto a 1.3 to 3 mil subbed polyester film base back-coated with a conductive carbon containing layer using an extrusion hopper, roll coater, gravure printer or other suitable method.

Other suitable supports which can be used include films of synthetic resins such as polyesters including polyethylene terephthalate, modified polyethylene terephthalate such as polyethylene terephthalate coextruded with silica or filled polyethylene terephthalate, polyethylene-2,6-naphthalate; polyolefins such as polyethylene, polypropylene; cellulose derivatives such as cellulose triacetate, cellulose diacetate, cellulose acetate butyrate, cellulose acetate propionate; polyvinyl resins such as polyvinyl chloride, polyvinylidene chloride; polycarbonates; polyamides; polyimides; metals such as aluminum, copper, tin, zinc, or a non-magnetic alloy containing them; ceramics such as glass, earthware, porcelain; barytes or papers such as paper spread coated or laminated with an alpha polyolefin and the like. The substrate can take any form including film, tape, sheet, disc, card, drum, and so on, particularly any form having a carbon containing backcoating, particularly a preferred carbon backcoating of the invention.

Carbon backcoatings generally contain from about 15 to about 25% of carbon black, from about 15 to about 25% of an inorganic filler, from about 0.5 to about 2% by weight of an abrasive, from about 20 to about 30% of a vinyl copolymeric binder, from about 15 to about 25% of a polyurethane binder, from about 7.5 to about 17.5% of a crosslinking agent, from about 0.9 to about 2% of a lubricant, and from about 0.06 to about 0.6% of a coating aid. All percentages are by weight of the dry weight of the backcoating which is preferably applied to provide a dry coating thickness of from about 0.3 to about 1.5 microns, most preferably about 0.5 micron. The backcoating composition is applied as a dispersion, preferably containing from about 8 to about 15% by weight of solids, most preferably 10%, in any suitable solvent such as any of those described herein, preferably mixtures thereof, most preferably approximately 4:3:3 mixtures of methylethylketone:methylisobutylketone:cyclohexanone. The backcoating layer can be applied by any suitable method using any suitable applicator means including an extrusion hopper, roll coater, gravure printer or the like.

More particularly, preferred carbon backcoatings contain from about 15 to about 25%, most preferably 19% by weight of any suitable carbon black such as those already described herein. The backcoating contains from about 15 to about 25%, preferably 19% by weight of any suitable inorganic filler such as any of the colloidal inorganic powders described herein, preferably a soft inorganic filler. Any of the silicates, oxides such as titanium dioxide, zinc oxide, and the like, carbonates such as sodium carbonate, potassium carbonate, calcium carbonate, magnesium carbonate, barium carbonate, and the like and mixtures thereof can be used. Calcium carbonate is most preferred.

Preferred backcoatings contain from about 0.5 to about 2% by weight, most preferably 1.5% of any suitable abrasive, particularly any of those already described herein, most preferably alpha alumina having a diameter in the range of 0.1–0.6 micron and a specific surface area ranging from about 1 to about 15 m²/g. Preferred backcoatings contain from about 20 to about 30% of a copolymeric vinyl binder, particularly a polyvinylchloride/polyacetate binder containing hydroxyl and/or carboxyl functional groups. Preferably, the vinyl binder contains (A) from about 6 to about 18% by weight, most preferably about 11.6%, of a carboxy modified vinyl chloride/vinyl acetate copolymer and (B) from about 9 to about 20%, most preferably about 14.5%, of an hydroxy modified vinyl chloride/vinyl acetate copolymer.

Preferred copolymer A is a 90:5 vinyl chloride:vinyl acetate copolymer containing carboxy groups (maleic acid) and having a number average molecular weight of about 28,000 and a Tg of 80 C. The copolymer is hydrolyzed to an hydroxy equivalent weight of about 850 g/g mol and has an hydroxyl content of about 2.3% by weight. Copolymer B is an hydroxy modified (6% hydroxy as vinyl alcohol) polyvinyl chloride:polyvinyl acetate (91:03) copolymer having a number average molecular weight of about 23,000 and a Tg of 79 C.

Preferred backcoatings contain from about 15 to about 30%, most preferably about 20.4% of any suitable polyurethane binder including those disclosed in U.S. Pat. No. 2,871,218 which is hereby incorporated herein by reference, any of those disclosed hereinbefore, particularly a polyether or polyester polyurethane, most preferably a polyester polyurethane. The most preferred polyurethane binder is a thermoplastic adduct of adipic acid, butanediol, and 4,4'-diphenylmethane diisocyanate having a weight average molecular weight of about 124,000. A preferred backcoating contains from about 7.5 to about 17.5%, most preferably about 12.3% of a suitable crosslinking agent. Any of the crosslinking agents described herein can be used. An NCO terminated adduct of trimethylol propane and tolylene diisocyanate (1:3) is particularly preferred.

Preferred backcoatings also contain from about 0.9 to about 2% of any suitable lubricant as already disclosed herein. More preferably, about 1.4% of any suitable fatty acid ester, most particularly a mixture of fatty acid esters, is employed. A most preferred fatty acid ester lubricant mixture is about a 4:2:2:6 mixture of butyl stearate, isocetyl stearate, tridecyl stearate, and ethylhexyl palmitate, respectively.

A preferred coating will contain from about 0.06 to about 0.6%, most preferably 0.13%, of any suitable coating aid such as, for example, those disclosed in U.S. Pat. No. 4,916,054, hereby incorporated herein by reference, and the like. Preferred are organofunctional silicone fluids such as silicone carbinols. The most preferred coating aid as used in Example 5 is a silicone carbinol having secondary alcohol functionality, a weight % OH of 0.9–1.1, and the formula

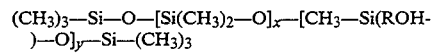

where x and y are any integers providing an average of 3 hydroxyl groups per molecule, an average hydroxyl equivalent weight of about 2000, a weight average molecular weight of about 6,000, and R is an alkyl group having 5–20 carbon atoms, preferably 10. The preferred backcoating is prepared as described in Example 5. The amount of the magnetic dispersion to be coated or applied to the substrate should yield a dry film thickness ranging from about 2 to about 3 microns.

The magnetic particles on the coated substrate can then be oriented, for example, by an orienting magnet immediately after the substrate is coated. The oriented coated substrate can then be dried, calendered, cured, and stored. When the substrate is a film, preferably a subbed polyester support, the coating is redried and recalendared and wound onto spools at low tension to reduce embossing patterns from being transferred through the wound media. After curing, for example at about 55 degrees C for a suitable time (e.g., 0, 3½, 7 days), the coated film can be slit to the desired dimension. Three and a half days cure time is optimum for the coatings of the invention.

Master tapes thus prepared have a high coercivity, about 2000 Oe, and are capable of transfering signals to a lower coercivity copy medium (about 850 to 1000 Oe). The master tapes have high durability and good electrical and recording performance. The adhesion of the magnetic coating to the base is superior to prior master tapes. The master media can have any other form suitable for containing signals to be duplicated one or multiple times to a suitable copy medium without erasing the signals from the master.

The master media and their processes of manufacture are further illustrated but are not intended to be limited by the following examples in which all parts and percentages are by weight unless otherwise indicated.

EXAMPLE 1

The wet out stage, grind stage, and let down stage including the polishing step and post preparation filtration of the process of the invention and the wet out and let down compositions are illustrated.

Stock solutions and dispersions were prepared as follows: Cyclohexanone (C), tetrahydrofuran (THF), methylethylketone (MEK) and toluene (T) were filtered through a 5 micron polypropylene filter and used to prepare stock solutions as in Table 1.

TABLE 1

| Solute | Solution % | Solvent Mixture | | | |
|---|---|---|---|---|---|
| | | THF | MEK | C | T |
| A - Lubricant Stock Solution | | | | | |
| Butyl myristate | 25 | 100 | 0 | 0 | 0 |
| Myristic acid | 25 | | | | |
| B - Binder Stock Solution | | | | | |
| Polyurethane (1) | 20 | 0 | 90 | 10 | 0 |
| C - Crosslinking Agent Stock Solution | | | | | |
| Polyisocyanate (2) | 50 | 0 | 100 | 0 | 0 |

(1) A linear hydroxy terminated polymer of butanediol-adipate and diphenyluethane diisocyanate having a molecular weight of 20,000–50,000 and a Tg of 58–61 C (Morthane CA118, Morton Thiokol, Inc, Chicago, IL 60606).
(2) An adduct of tritmethylolpropane and tolylene diisocyanate (1:3) (Mondur CB-75, Mobay Chemical Corp, Pittsburgh, PA 15205).

D—Abrasive Stock Dispersion

A dispersion of alpha alumina having a median particle diameter of 0.38 micron and a specific surface area of 6 m²/g (or Alumina AKP30 available from Sumitomo Corp, Chuoku, Tokyo, Japan) in 11 parts MEK and 89 parts of C contained 57% by weight of solids. As weight % of solids, the dispersion contained 95.24% of alumina, 1.9% of the 4:1 mixture of mono- and di-alkarylethyleneoxy esters of phorphoric acid (or Gafac RE610 available from GAF Corp, New York, N.Y. 10020), and 2.86% of polyurethaned (1).

E—Carbon Black Stock Dispersion

A carbon black dispersion containing 31% by weight of solids in 50 parts of MEK, 40 parts of C and 10 parts of T was also prepared. The carbon black dispersion comprised 96.15% of Elftex 12 (available from Cabot Corp, Boston, Mass. 02110) and 3.85% of Centrolex P (available from Central Soya, Fort Wayne, Ind. 46802). The abrasive and carbon dispersions were each prepared by ball milling using known procedures.

Wet Out Stage

Metallic iron particles of high surface area are pyrophoric in ambient air. Accordingly, cans of raw pigment chunks were opened in a large glove box from which oxygen had been purged with nitrogen gas until the atmosphere contained less than 3% oxygen. An oxygen analyzer and audible alarm system were used to monitor the atmosphere in the glove box continuously throughout the wet out process. For small scale experiments (e.g., two kilograms of dispersion), the solvent-wetted pigment slurry could subsequently be exposed to air without concern. For pilot scale experiments (e.g., thirty kilograms of dispersion), the complete wet out process should be conducted in an inert atmosphere (97–98% nitrogen, 3–2% oxygen).

A glove box purged with nitrogen as described above was used. Solvent comprising about 492.66 g MEK, 391.26 g C, and 99.16 g T were placed in a grounded metal container and mixed with about 24.4 g of lecithin (Centrolex P) using a Cowles type disperser. Then, 450 g of metallic iron magnetic pigment (Pferromet PK2000) were carefully added to the container with continuous stirring using the Cowles blade. The abrasive stock dispersion (66.31 g) and about 30.19 g of carbon black stock dispersion (Elftex 12) were added to the resulting slurry at this stage. After being mixed for two hours, the slurry was sealed and allowed to stand for from 4 to 24 hours.

Grind Stage

The slurry was transferred to a funnel on a small media mill (Eiger Machinery Inc, Model 250) which was loaded with 85% by volume of glass beads having a diameter of 1 to 1.3 mm. The dispersion was mixed continuously using a Cowles blade in the funnel/reservoir to which the mill base was recirculated for 3 hours in the mill at 14 m/sec rotor tip speed.

The progress of milling of the dispersion was monitored at half hour intervals by microscopic examination at 100× of a small sample drawn down on a Fineness of Grind Gauge, and by measuring the B/H meter hysteresis loop of a dry hand coated sample transferred to adhesive tape. The latter is the most sensitive method for determining whether primary particles have been broken in the milling step.

Let Down Stage

The stock binder solution (628.3 g at 20% solids) was diluted with a solvent mixture containing 24.2 g THF, 46.28 g MEK, 114.7 g C, and 2.38 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the probability of fracturing the pigment particles.

When the addition of the binder is complete, the stock lubricant mixture of 1:1 w/w myristic acid/butyl myristate (20.7 g) was slowly added. The resulting dispersion was then "polished" at a tip speed of about 10 m/sec for about thirty minutes. The dispersion quality parameters were again assessed by microscopic examination at 100× of the draw down on a fineness of grade gauge to confirm the absence of oversized particles or flocculation of the dispersion. In addition, the shape of the hysteresis loop and its derivative can be used to assess coercivity squareness and absence of particle breakage.

The crosslinking agent stock solution (28.2 g) was then slowly stirred into the dispersion with continued milling for 10 minutes after addition was complete. The dispersion was then removed from the mill and filtered through a 6 micron absolute rating polypropylene woven filter (PALL Trinity Corp, Cortland, N.Y., 13045).

EXAMPLE 2

The wet out stage, grind stage, and let down stage procedures outlined in Example 1 were followed except that the solvent mixture for the wet out stage contained 505.77 g MEK, 404.62 g C, and 101.16 g T with 24 g of lecithin (Centrolex P) dissolved therein. About 49.74 g of the alumina stock dispersion and 60.39 g of the carbon black dispersion were used in the wet out stage. The grind stage was repeated as described in Example 1.

In the let down stage, stock binder solution (630.5 g at 204 solids) was diluted with a solvent mixture containing 24.2 g THF, 45.16 g MEK, 114.88 g C, and 2.47 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing pigment particles. The remainder of the procedure of Example 1 was followed.

EXAMPLE 3

The wet out stage, grind stage, and let down stage procedures outlined in Example 1 were followed except that the solvent mixture for the wet out stage contained 470.66 g MEK, 376.53 g C, and 94.13 g T with 21 g of lecithin (Centrolex P) dissolved therein. Then, 420 g of metallic iron granules (Pferromet PK2000) were carefully added to the solvent/lecithin solution with continuous stirring using a Cowles type disperser. Thereafter, about 42.61 g of the alumina stock dispersion and 56.36 g of the carbon black dispersion were used in the wet out stage process described in Example 1. The grind stage was repeated as described in Example 1.

In the let down stage, stock binder solution (741.3 g at 20% solids) was diluted with a solvent mixture containing 7.64 g THF, 100.46 g NEK, 94.46 g C, and 12.32 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing pigment particles.

When the addition of the binder was complete, the stock lubricant mixture 1:1 w/w myristic acid/butyl myristate (20.2 g) was slowly added. The resulting dispersion was then "polished" at a tip speed of about 10 m/sec for about thirty minutes. The dispersion quality parameters were again assessed as described in Example 1. The crosslinking agent stock solution (25.9 g) was then slowly stirred into the dispersion with continued milling for 10 minutes after addition was complete. The remainder of the procedure of Example 1 was followed as described.

EXAMPLE 4

The wet out stage, grind stage, and let down stage procedures outlined in Example 1 were followed except that the solvent mixture for the wet out stage contained 8.93 g THF, 437.54 g MEK, 357.18 g C, and 89.29 g T with 20 g of lecithin (Centrolex P) dissolved therein. About 400 g of metallic iron granules (Pferromet PK 2000) were carefully added to the lecithin solution with continuous stirring using the Cowles blade. About 24 g of alumina having a median particle diameter of 0.38 micron and a specific surface area of $6m^2/g$ (Sumitomo AKP-30) abrasive powder and an aluminum oxide filler having a median crystallite diameter of about 0.02 micron and a specific surface area of $100\ m^2/g$ (Degussa Oxid C) were added to the metallic iron dispersion with stirring. After the slurry was mixed for about two hours, it was sealed and allowed to stand for from about 24 hours. The grind stage was repeated as described in Example 1.

In the let down stage, stock binder solution (559.2 g at 20% solids) was diluted with a solvent mixture containing 12.58 g THF, 4.86 g MEK, 149.44 g C, and 2.82 g T. The resulting solution was added slowly with continuous stirring and milling to the grind phase composition over a period of 1 to 2 hours to avoid "colloidal shock". During the addition, the tip speed of the mill was gradually reduced to about 10 m/sec as the mill base viscosity decreased. This further reduces the likelihood of fracturing of pigment particles.

When the addition of the binder was complete, the lubricant stock solution (18.4 g) was added slowly. The resulting dispersion was then "polished" at a tip speed of about 10 m/sec for about thirty minutes. The dispersion quality parameters were again assessed as described in Example 1. The crosslinking agent stock solution (32 g) was then slowly stirred into the dispersion with continued milling for 10 minutes after addition was complete. The remainder of the procedure of Example 1 was followed.

EXAMPLE 5

A subbed polyethylene terephthalate substrate having a thickness of about 1.3 mil or 33 microns was backcoated at a rate of about $2cc/ft^2$ with a carbon dispersion having a 10% solids content using an extrusion die to provide a dry backcoat thickness of about half a micron.

The backcoating was prepared by ball milling about 175 g of carbon black, 175 g of calcium carbonate, 14 g of alumina abrasive, and about 428 g of a 25% by weight solution in a solvent mixture of a 90:5 vinyl chloride:vinyl acetate copolymer containing carboxyl (maleic acid) groups and having a number average molecular weight of about 28,000 and a Tg of 80 C. The copolymer was hydrolyzed to an hydroxy equivalent weight of about 850 g/g mol and the solvent mixture contains about 438 parts of methylethylketone (MEK), about 328.5 parts of methyl isobutylketone (MIBK), and about 328.5 parts of cyclohexanone (C). Milling was continued for about 72 hours at about 80 rpm. The solids content of the milled dispersion was about 25%.

About 360 g of a mixture of about 144 g of MEK, about 108 g of MIBK, about 108 g of C were added to the ball mill and mixed for about 5 minutes. The resulting dispersion was poured through a wire mesh strainer. The solids content was reduced to about 21% in this step.

About 558 g of a 15% solution in the above solvent mixture of a polyesterurethane having a weight average molecular weight of about 124,000 and prepared from adipic acid, butanediol, and 4,41-diphenylmethane diisocyanate were added with mixing over about a two minute period for each 1000 g of the resulting 21% solids dispersion. Thereafter, about 237 g of a 25% solution in the above solvent mixture of an hydroxy modified (6% hydroxy as vinyl alcohol) vinyl chloride:-vinyl acetate (91:03) copolymer baring a number average molecular weight of about 23,000 and a Tg of 79 C. were added with mixing over about a two minute period for each 1000 g of the dispersion. The solids content was reduced to 20% in this step.

Sequentially, (1) about 3.2 g of a 4:2:2:6 mixture of butyl stearate, isocetyl stearate, tridecyl stearate and ethylhexyl palmitate; (2) about 0.3 g of a graft copolymer silicone polycarbinol having about 1 weight % of secondary alcohol functionality and average number of OH groups per molecule of 3, a viscosity of 160 cps and an average hydroxy equivalent weight of about 2000; and (3) about 38.2 g of an NCO terminated adduct of trimethylolpropane and tolylene diisocyanate, each in a small amount of the solvent mixture, are added per 1000 g of the 204 solids dispersion while stirring with a Cowles blade. Additional solvent mixture to total about 1280 g of solvent mixture was added while stirring with a Cowles blade. The mixture was polished in an Eiger mill for one pass at 3500 rpm shaft speed, filtered through a 3 inch Pall Sealkleen 5 micron absolute polypropylene cartridge, and contained about 10% nonvolatiles. The backcoat formula contained about 1.384 totil lubricants, about 39.6% total pigments and about 59% total binders for a pigment/binder ratio of about 0.67 and a solids content of about 10% by weight.

Master media were prepared by applying magnetic dispersions of Examples 1–4 containing about 32% solids laid down at a rate of about 2 cc/ft$^2$ onto backcoated substrates as described above to provide a dry magnetic layer thickness for testing of about 2.5 microns. The webs, freshly coated using an extrusion die, were passed through an orientation magnet to enhance the longitudinal orientation of the pigment (measurable by B/H meter or VSM) and then conveyed through a series of driers before being calendered and wound up on a tape spool. The webs were subsequently passed through the driers and then calendared and rewound onto a core at reduced tension to prevent the formation of embossing patterns on winding up and subsequent curing at 55 C. The coated and cured media were slit to ½ inch widths and tested for electrical performance, friction coefficient, and master-to-slave transfer. Excellent results were obtained which were, in all cases, far superior to those obtained using master tapes which are commercially available.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for anhysteretically recording information onto a first web bearing a first, magnetic recording medium, said first web having a first pair of opposed edges separated by a first width of said first web, said apparatus comprising:
   a circular cylindrical drum having a first exterior cylindrical surface with a second pair of opposed edges separated by a second width at least as long as said first width;
   a first annular band of elastomeric material supported by and extended around said drum, said band of elastomeric material having a second exterior cylindrical surface concentric with said first exterior cylindrical surface;
   a first length of a second web having opposite ends and a third exterior surface, said second web comprising a second, magnetic recording medium, said second web further having a first interior surface adhered to said second exterior cylindrical surface, said elastomeric material at said second exterior cylindrical surface and said second web at said interior surface being mutually but removeably adherent directly to one another, said first length being supported by and wrapped as a band of said second, magnetic recording medium around said second exterior cylindrical surface, said opposite ends of said first length being butted to one another on said second exterior surface of said band of elastomeric material to complete said band,
   said band of said second, magnetic recording medium being in position to contact said first, magnetic recording medium, when said first web is wrapped onto said drum, to anhysteretically transfer information in an annular zone defined by an interface between said first length and said first web; and
   means associated with said drum for applying subatmospheric pressure at said first cylindrical surface at locations spaced from said annular zone, to cause said first web to establish sufficiently intimate contact with said first length for anhysteretic recording in said annular zone.

2. Apparatus according to claim 1, wherein said interface between said second web and said first web occurs along at least one of said first pair of edges.

3. Apparatus according to Claim 1, wherein said elastomeric material has a Shore A hardness in the range of 10 to 40 durometer.

4. Apparatus according to claim 1, wherein said elastomeric material is a polyester polyurethane; said interior surface of said second web comprises a surface layer of polyester contacting said polyurethane; and said second web has a thickness in the range of 0.00025 to 0.0035 inch.

5. Apparatus according to claim 1, further comprising:
   a second annular band of elastomeric material supported by and extended around said drum, said second band of elastomeric material having a fourth exterior cylindrical surface concentric with said first exterior cylindrical surface; and
   a second length of said second magnetic recording medium, said second length also having opposite ends and a second interior surface adhered to said fourth exterior cylindrical surface, said elastomeric material at said fourth exterior cylindrical surface and said second length at said second interior surface being mutually but removeably adherent directly to one another, said second length being supported by and wrapped as a further band of said second, magnetic recording medium around said fourth exterior cylindrical surface, said opposite ends of said second length being butted to one another on said fourth exterior cylindrical surface to complete said further band, said further band of said second, magnetic recording medium also being in position to contact said first, magnetic recording medium, when said first web is wrapped onto said drum, to anhysteretically transfer information in a further annular zone defined by an interface between said second length and said first web.

6. Apparatus according to claim 5, wherein each of said first pair of opposed edges is positioned essentially midway of a corresponding one of said bands of said second, magnetic recording medium.

7. Apparatus according to claim 1, wherein said means for applying comprises:

a plurality of circumferential grooves in said first exterior cylindrical surface;

a plurality of axial grooves in said first exterior cylindrical surface, said axial grooves intersecting said circumferential grooves;

a plurality of radial bores extending from said grooves into said drum; and means for applying subatmospheric pressure to said radial bores over an arc of a circumference of said drum, whereby subatmospheric pressure is applied between said first web and said drum.

8. Apparatus according to claim 1, wherein said first, magnetic recording medium has a coercivity in the range of 850 to 1500 Oe; and said second, magnetic recording medium has a coercivity of about 2000 Oe.

9. Apparatus according to claim 1, further comprising:

means for driving said drum at an essentially constant velocity to meter said first web through said apparatus;

a first means, upstream of said drum, for applying tension to said first web approaching said drum; and a second means, downstream of said drum, for applying tension to said first web leaving said drum.

10. Apparatus according to claim 1, further comprising:

means for mounting said drum for rotation in response to movement of said first web;

means for applying tension to said first web approaching said drum;

a metering roll downstream of said drum;

means for driving said metering roll at an essentially constant velocity to meter said first web through said apparatus; and means for applying tension to said first web leaving said metering roll.

11. A method for anhysteretically recording information on a first web bearing a first, magnetic recording medium, said web having a first pair of opposed edges separated by a first width of said web, said method comprising the steps of:

providing a circular cylindrical drum having a first exterior cylindrical surface with a second pair of opposed edges separated by a second width at least as long as said first width; at least one annular band of elastomeric material supported by and extended around said drum, said band of elastomeric material having a second exterior cylindrical surface concentric with said first exterior cylindrical surface;

providing at least one length of a second web having opposite ends and a third exterior surface, said second web comprising a second, magnetic recording medium, said second web further comprising an interior surface mutually but removeably adhereable to said second exterior cylindrical surface;

wrapping said length as a band of said second, magnetic recording medium around said second exterior cylindrical surface;

butting said opposite ends to one another on said second exterior surface to complete said band, said band of said second, magnetic recording medium being in position to contact said first, magnetic recording medium, when said first web is wrapped onto said drum, to anhysteretically transfer information in an annular zone defined by an interface between said second web and said first web;

wrapping said first web around an arc of said first exterior cylindrical surface to define said interface between said first, magnetic recording medium and said second, magnetic recording medium;

applying subatmospheric pressure through said first exterior cylindrical surface at locations spaced from said annular zone, to cause said first web to establish sufficiently intimate contact with said second web for anhysteretic recording in said annular zone;

rotating said drum; and applying a magnetic bias field to cause said transfer.

* * * * *